United States Patent [19]

Vondracek

[11] Patent Number: 5,534,088
[45] Date of Patent: Jul. 9, 1996

[54] METHOD OF OPTIMIZING THE DISTRIBUTION OF INHERENT STRESS IN SPRINGS

[75] Inventor: Hans Vondracek, Breckerfeld, Germany

[73] Assignee: Hoesch Federn GmbH, Hagen, Germany

[21] Appl. No.: 303,609

[22] Filed: Sep. 9, 1994

[30] Foreign Application Priority Data

Sep. 11, 1993 [DE] Germany ................ 43 30 832.5

[51] Int. Cl.$^6$ .................. C21D 7/06; C21D 9/02
[52] U.S. Cl. ........................... 148/580; 148/908
[58] Field of Search ............... 148/580, 908; 29/173

[56] References Cited

U.S. PATENT DOCUMENTS 5,152,851  10/1992  Yamamoto et al. ............ 148/580

FOREIGN PATENT DOCUMENTS 621760  8/1978  U.S.S.R. .......................... 148/580

Primary Examiner—Deborah Yee
Attorney, Agent, or Firm—Max Fogiel

[57] ABSTRACT

A method of optimizing the distribution of inherent stress in springs intended for vehicle suspensions, especially in the rod cross-section of high-strength helical compression springs, whereby the springs are set and bombarded with balls. The springs are forwarded for the operations setting and bombardment at a gradient of strength prescribed for the particular rod cross-section.

8 Claims, 1 Drawing Sheet

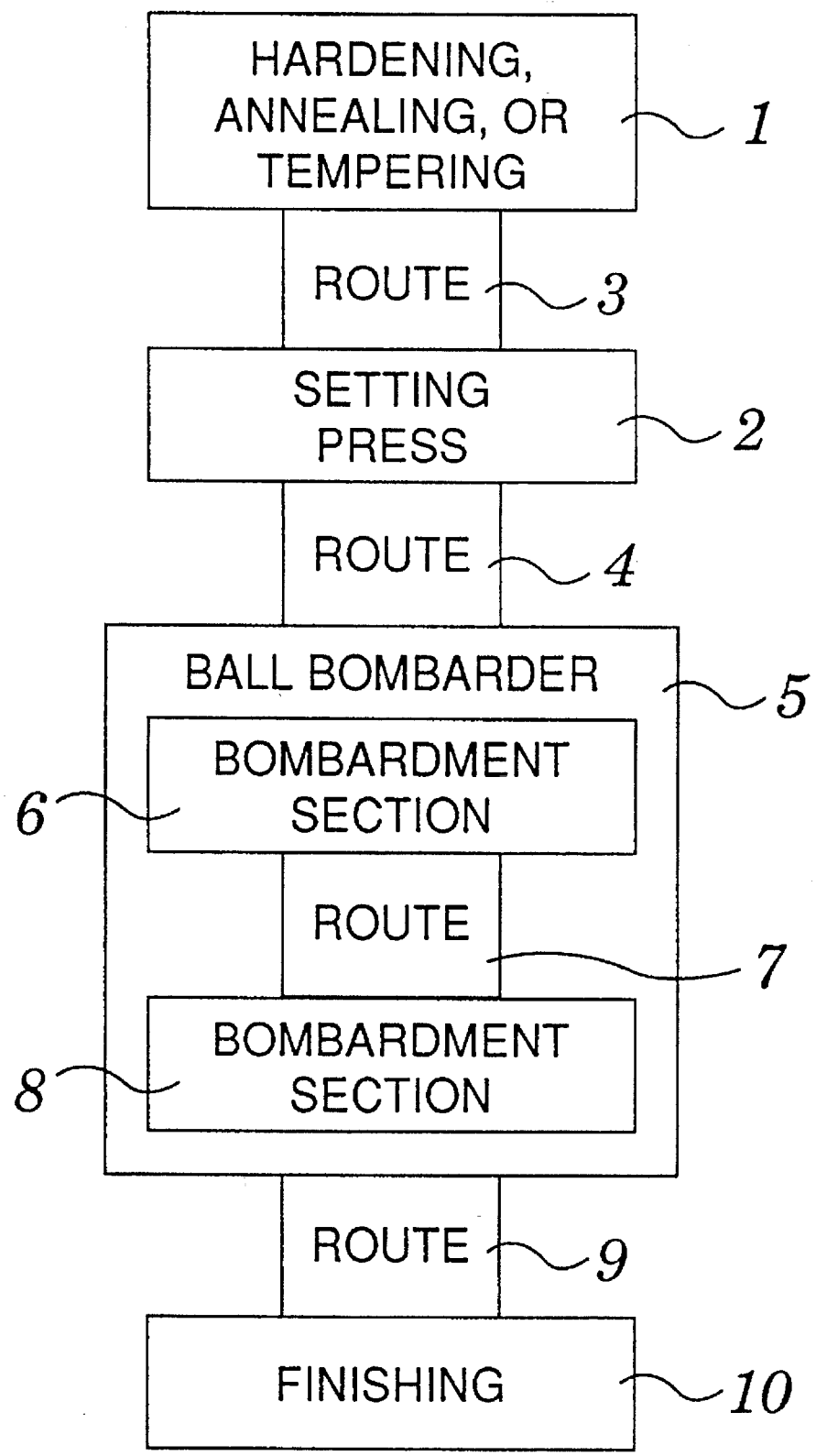

METHOD OF OPTIMIZING THE DISTRIBUTION OF INHERENT STRESS IN SPRINGS

BACKGROUND OF THE INVENTION

A distribution of inherent stress wherein the resultant load stress in the most highly loaded cross-section of the finished spring never reaches the compression or tension flow threshold at any point in the cross-section and a critical tension of 200 N/mm² is never exceeded in the marginal area near the surface.

There are two major methods of intentionally affecting inherent stresses in springs at the state of the art, specifically setting and ball bombardment. They modify the inherent-stress distribution primarily in a specific cross-sectional areas associated with the particular method. Setting, or plasticizing, means the initial subjection to load of a spring once shaped and treated whereby the material's flow threshold is exceeded in some areas of the spring's cross-section in accordance with the type of spring and stress.

The ratio between the plasticized cross-sectional area and the overall cross-section is called the degree P of plasticization. It dictates in conjunction with the material-specific flow threshold the level and distribution of the inherent stresses induced by the setting operation.

Locally demarcated alteration of the flow threshold provoked by the prescription for a specific gradient of strength or temperature in the spring's cross-section during the setting operation can accordingly be used to modify both the level and distribution of inherent stress in the sense of optimization.

Whereas the inherent stresses are subjected to directional modifications over the total cross-section depending on the type of stress, monaxial during bending or biaxial during torsion, and on the direction of stress, specifically tension or compression, during setting, the area affected by ball bombardment is essentially restricted to the marginal areas near the surface, whereby an orthogonal distribution of stress is produced in the outer layer independent of the type of spring or stress.

U.S. Pat. No. 2,608,752 describes, with a single-leaf spring as an example, a method whereby the tension side of the spring is stressed (60–100% $R_e$) and bombarded with balls. The method has been introduced into practice as "stressed bombardment", and many versions are now being employed worldwide for single-leaf and parabolic springs.

Machinery and devices for bombarding leaf springs and various versions of the method are described in U.S. Pat. No. 3,094,768 and GB Patent 959 801.

An alternative to stressed bombardment that achieves a similar effect without the drawback of relatively major distortion is the bombardment method described in U.S. Pat. No. 3,205,556, whereby leaf springs are bombarded with balls while unloaded (without being tensioned that is) but at high temperatures (150°–350° C.). This "heated bombardment" has not as yet been successful in practice. One reason is that recent developments make it possible to compensate for the more severe distortions that accompany stressed bombardment simply by modifying the bending tool. Another is that heated bombardment does not as a rule extend the life of the spring to that extent that stressed bombardment does.

Common to all the publications heretofore cited is that the fields of application they describe by way of example strictly relate to leaf springs that are essentially stressed monaxially.

Valid predictions as to life extension cannot, especially considering the sequence of individual operations in conjunction with optimization of the inherent-stress distribution, be applied to torsionally stressed springs without taking the essentially biaxial stress into consideration.

Setting followed by bombardment of helical compression springs, however, is known from the 1987 Hoesch Hohenlimburg AG publication "Warmgeformte Federn".

SUMMARY OF THE INVENTION

The object of the present invention is an improved method of the genus heretofore described that will even further extend the lives of helical compression springs with strengths $R_m \geq 1800$ n/mm² in particular.

Advantageous and practical steps of the method in accordance with the present invention are recited in claims 2 through 7.

The advantages of the method in accordance with the present invention are that it allows either the life of a helical compression spring to be extended or its weight decreased depending on the purpose of optimization.

BRIEF DESCRIPTION OF THE DRAWINGS

The method in accordance with the present invention will now be specified with reference to the accompanying drawing which the Figure is a schematic block diagram showing the flow and processes of the present invention.

DESCRIPTION OF THE PREFERRED EMBODIMENTS

The point of departure for the present invention is that helical compression springs, whether shaped cold or half-hot, are forwarded still residually hot from such prior operations 1 as hardening, annealing, or tempering to a setting press 2 along a route 3 and then, directly after being set, along another route 4 to a ball bombarder 5 that consists of at least two independent bombardment sections 6 and 8, whereby the springs can be heated or cooled to a prescribed temperature while they are traveling routes 3 and 4 upstream of and between the setting press and bombarder. What is decisive here is that the particular heat treatment produces a temperature or strength gradient in the cross-section of the spring's rod that is appropriate for the next operation.

The bombardment in the first section 6 of the bombarder is usually intended to condition the spring for bombardment in second section 8, which is provided with everything necessary for the stressed bombardment of helical compression springs.

Conditioning in the present sense is to be understood as anything that will augment the profound effect in particular of the ball-bombardment treatment.

Subsequent to bombardment in second section 8, the springs are forwarded over a third route 9 to a finishing point 10.

In addition to such standard techniques as increasing the bombardment energy (½ mV²) by increasing the speed and/or mass, specifically the diameter, of the projectiles, a spring can be forwarded to upstream bombarder section 6 along route 4 and bombarded therein at a temperature or strength gradient appropriate to the particular material.

Ball bombardment is in the present context and to the extent accompanied by heat not being employed as an alternative to stressed bombardment to minimize the distortion and misshaping provoked thereby but rather as a reasonable supplement to and preparation for it.

Once they have been bombarded in upstream bombarder section 6, the springs are forwarded over route 7 to second bombarder section 8, wherein they are stressed to a prescribed length or subject to a prescribed load and subjected to ball bombardment in that state.

To ensure bombardment as uniform as possible on all sides, the springs must be rotated around their longitudinal axis or oscillated in the hot spot in the trajectory of the balls. This can be done continuously or discontinuously.

I claim:

1. A method for optimizing distribution of stress in rod cross-sections of high-strength helical compression springs in vehicle suspensions, comprising the steps of: supplying springs at a gradient of temperature and strength prescribed for a specific rod cross-section; setting the springs; bombarding the set springs; with balls to vary the cross-sectional stress distribution in helical springs by locally demarcated control of the flow threshold in the cross-section of the rod, so that asymmetry of the stress distribution derived from curvature of the springs can be varied; and tempering by sections generating definite temperature contours in the cross-section of the springs to control stress induced during said setting and bombarding steps.

2. A method for optimizing distribution of stress in rod cross-sections of high-strength helical compression springs in vehicle suspensions, comprising the steps of: supplying springs at a gradient of temperature and strength prescribed for a specific rod cross-section; setting the springs; bombarding the set springs with balls to vary the cross-sectional stress distribution in helical springs by locally demarcated control of the flow threshold in the cross-section of the rod, so that asymmetry of the stress distribution derived from curvature of the springs can be varied; and tempering by sections generating definite temperature contours in the cross-section of the springs to control stress induced during said setting and bombarding steps, the strength gradient prescribed for the specific rod cross-section being temporarily induced by specific heating or cooling prior to said setting and bombarding steps, said strength gradient prescribed for the specific rod cross-section being permanently induced prior to said setting and bombarding steps and being present at room temperature, the prescribed strength gradient prior to said setting step differing from the prescribed strength gradient prior to said bombarding step; and a further bombarding step comprising a stressed bombarding downstream of said setting and first-mentioned bombarding step.

3. A method as defined in claim 1, wherein the strength gradient prescribed for the specific rod cross-section is temporarily induced by specific heating or cooling prior to said setting and bombarding steps.

4. A method as defined in claim 1, wherein the strength gradient prescribed for the specific rod cross-section is permanently induced prior to said setting and bombarding steps and is present at room temperature.

5. A method as defined in claim 1, wherein the prescribed strength gradient prior to said setting step differs from the prescribed strength gradient prior to said bombarding step.

6. A method as defined in claim 1, wherein the prescribed strength gradient is substantially constant along the rod.

7. A method as defined in claim 1, wherein the prescribed strength gradient varies along the rod.

8. A method as defined in claim 1, including a further bombarding step comprising a stressed bombarding downstream of said setting and first-mentioned bombarding step.

* * * * *